(12) United States Patent
Orban et al.

(10) Patent No.: US 6,672,422 B2
(45) Date of Patent: Jan. 6, 2004

(54) SEISMIC DATA ACQUISITION

(75) Inventors: Jacques Orban, Garches (FR); Simon Frederick Tong, Croissy sur Seine (FR)

(73) Assignee: WesternGeco, L.L.C., Houston, TX (US)

( * ) Notice: Subject to any disclaimer, the term of this patent is extended or adjusted under 35 U.S.C. 154(b) by 0 days.

(21) Appl. No.: 10/181,276

(22) PCT Filed: Jan. 12, 2001

(86) PCT No.: PCT/IB01/00028
§ 371 (c)(1),
(2), (4) Date: Oct. 7, 2002

(87) PCT Pub. No.: WO01/51956
PCT Pub. Date: Jul. 19, 2001

(65) Prior Publication Data
US 2003/0075380 A1 Apr. 24, 2003

(30) Foreign Application Priority Data
Jan. 14, 2000 (GB) .............................................. 0000919

(51) Int. Cl.⁷ ................................................. G01V 1/00
(52) U.S. Cl. ........................ 181/108; 367/76; 181/111; 181/112; 181/122

(58) Field of Search ................................. 181/108, 111, 181/112, 114, 122; 376/76; 367/13, 78, 20, 177, 58, 59, 76, 154

(56) References Cited
U.S. PATENT DOCUMENTS 5,089,995 A * 2/1992 Hackett ........................ 367/76
5,627,798 A * 5/1997 Siems et al. ................... 367/76

* cited by examiner

Primary Examiner—Robert Nappi
Assistant Examiner—Renata McCloud
(74) Attorney, Agent, or Firm—Streets & Steele; David S. Figatner

(57) ABSTRACT

A seismic data acquisition technique comprises laying a seismic data cable having a plurality of spaced apart connection nodes and a plurality of sensor strings connected to the connection nodes along a line of the area to be seismically surveyed. Each sensor string comprises ten or more seismic sensors for producing respective output signals representative of a seismic signal received by them. The sensors of the sensor strings are laid out in at least two sets of groups, each group containing several of the sensors and transmitting at least one seismic signal to a connection node, and the sets of groups being disposed along respective spaced apart lines generally parallel to the line along which the seismic data cable is laid.

10 Claims, 8 Drawing Sheets

SEISMIC DATA ACQUISITION

This invention relates to seismic data acquisition methods and apparatus, and is more particularly but not exclusively concerned with such methods and apparatus for use in conjunction with seismic data acquisition methods and apparatus of the kind disclosed in PCT Patent Applications Nos PCT/GB97/02544 (WO 98/14800) and PCT/IB99/01724 (WO 00/26694).

At the present time, the process of setting up and conducting a typical large 3D seismic survey in land or transition zone environment involves laying out an array of substantially parallel main seismic data cables, each typically several thousand meters long and each having a large number of sensor strings connected to them at respective connection nodes, over the area to be surveyed. The main cables are typically spaced about 400 meters apart, while the connection nodes are typically spaced at about 50 meter intervals along the main cables. Each sensor string typically has as many as 10 analogue or digital geophones or equivalent seismic sensors connected in it, the sensors of a single string forming a group whose outputs are combined (in the simplest case, summed), and the centres of the groups attached to a given main cable being substantially aligned along a line coincident with or substantially parallel to that main cable.

Once the array of main cables and seismic sensors is laid out as described above, at least one seismic source, typically a vehicle-mounted vibrator, traverses the survey area, along lines substantially perpendicular to the main cables and also typically 400 meters apart. The vehicle typically stops every 50 meters, and the vibrator is energised to direct a swept frequency acoustic signal downwardly into the earth formations beneath the survey area, for reflection by the formations and detection by the sensors. As the survey progresses, the main cables at one end of the array may be successively transferred to the other end, to effectively move the array along the survey area in the direction in which the source or sources move.

It will be appreciated that the above described process is very expensive, inter alia because it requires a large number of field personnel and takes a substantial amount of time. It is an object of the present invention to provide methods and apparatus which make the process more efficient.

According to a first aspect of the present invention, there is provided apparatus for use in seismic data acquisition in a land or transition zone environment, the apparatus comprising:
 at least one seismic data cable which, in use, is laid out along a line of the area to be seismically surveyed, said cable having a plurality of spaced apart connection nodes therealong; and
 a plurality of sensor strings connected to said connection nodes, each sensor string comprising a plurality of seismic sensors each adapted to produce a respective output signal representative of a seismic signal received thereby;
 wherein the sensor strings are adapted to permit the sensors to be laid out in at least two sets of groups, each group containing a plurality of the sensors and being adapted to transmit at least one seismic signal to a connection node, and the sets of groups being disposed along respective spaced apart lines generally parallel to the line along which the seismic data cable is laid.

In a preferred embodiment of this first aspect of the invention, each sensor is adapted to produce a digital output signal representative of the seismic signal received thereby, and a respective digital identifying signal which identifies the sensor, and is connected to transmit both digital signals to the respective connection node.

The sensors of each sensor string may be divided between a group in the first set and a group in the second set (although this is not strictly necessary), in which case the sensor string preferably includes a portion of increased length between the sensors in the group in the first set and the sensors in the group in the second set, to facilitate the spacing apart of the groups.

According to a second aspect of the invention, there is provided a method of seismic data acquisition, the method comprising:
 laying a seismic data cable along a line of the area to be seismically surveyed, said cable having a plurality of spaced apart connection nodes therealong, and a plurality of sensor strings connected to said connection nodes, each sensor string comprising a plurality of seismic sensors each adapted to produce a respective output signal representative of a seismic signal received thereby;
 laying the sensors of the sensor strings out in at least two sets of groups, each group containing a plurality of the sensors and transmitting at least one seismic signal to a connection node, and the sest of groups being disposed along respective spaced apart lines generally parallel to the line along which the seismic data cable is laid;
 emitting seismic signals downwardly into the area to be surveyed, for reflection by earth formations beneath the area; and
 detecting the reflected signals with the sensors.

In a preferred implementation of this second aspect of the invention, each sensor is adapted to produce a digital output signal representative of the seismic signal received thereby, and a respective digital identifying signal which identifies the sensor, and both digital signals are transmitted to the respective connection node.

In practice, the at least one-seismic data cable is successively laid, or more conveniently a plurality of such seismic data cables are concurrently laid, along generally parallel lines, which are typically several hundred meters apart, while the respective lines along which the sets of sensors are disposed are typically less than 100 meters, eg 50 meters, apart.

The sensors of each sensor string may be divided between a group in the first set and a group in the second set (although this is not strictly necessary), in which case the method preferably further comprises including a portion of increased length in each sensor string between the sensors in the group in the first set and the sensors in the group in the second set, to facilitate the spacing apart of the groups.

Conveniently, the acoustic signals are emitted at substantially uniformly spaced points along at least one line substantially perpendicular to the seismic data cable, and the spacing of the respective lines of the sets of groups of sensors connected to the seismic data cable is substantially equal either to the spacing of said points, or to half the spacing of said points.

The sensor strings may be connected to the seismic data cable either before or after the seismic data cable is laid.

The invention will now be described, by way of example only, with reference to the accompanying drawings, of which:

Figure 1:
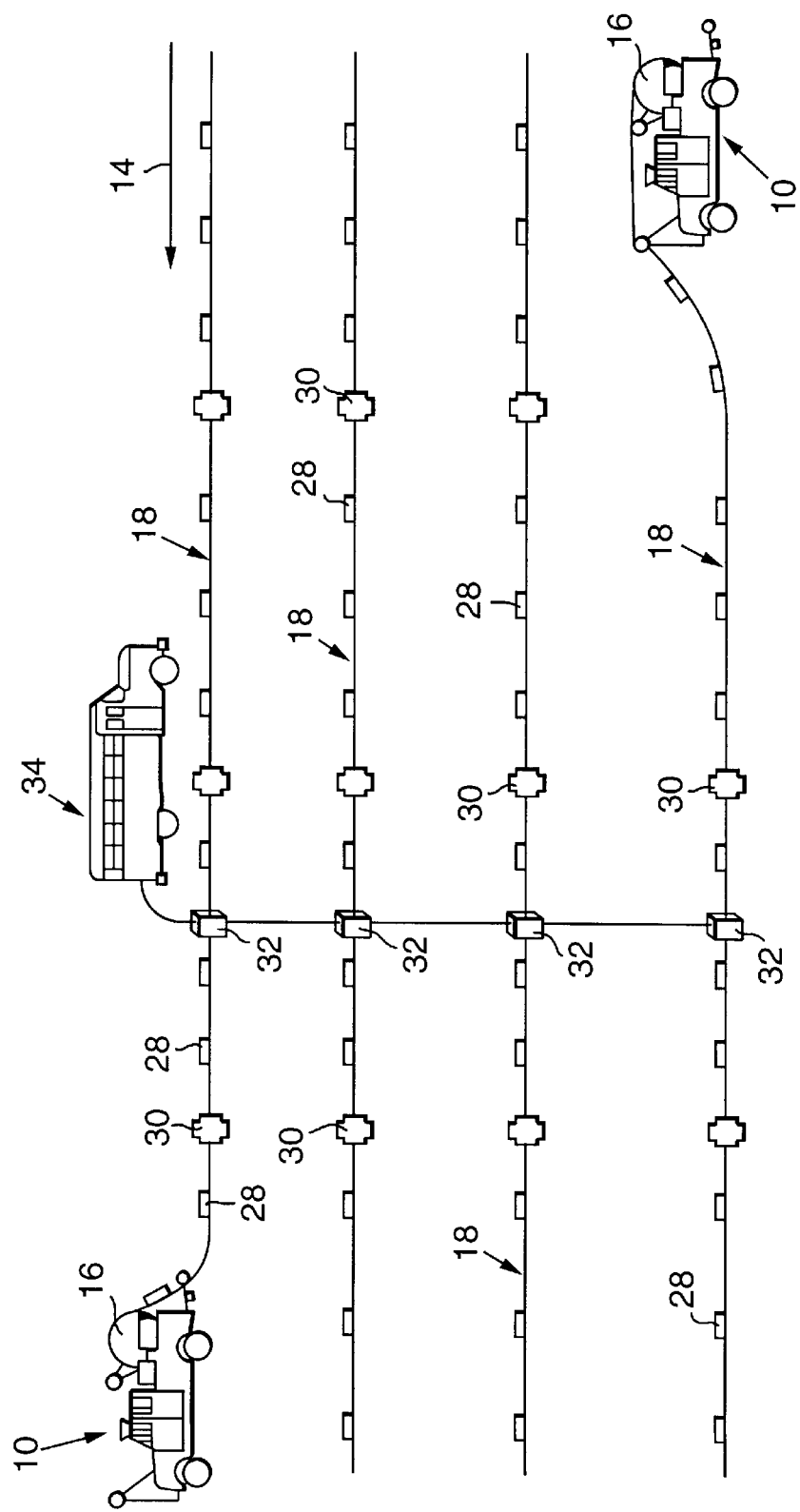
FIG. 1 is a schematic and simplified plan of a seismic cable layout for use in a seismic survey.

In FIG. 1, a schematic and simplified plan of a seismic survey spread illustrates how seismic cable is laid out (and picked up again) according to the invention.

A seismic cable spool vehicle 10 (in FIG. 1 this is the upper vehicle) is moved to a desired seismic survey line 14. In FIG. 1 the cable spool vehicle 10 is shown as a self-propelled vehicle, but without limiting the invention this vehicle may also be trailer or the like that is pulled by another type of vehicle. A cable drum 16 mounted on the cable spool truck 10 contains seismic cable 18 (see also FIGS. 2 and 3). A full standard drum 16 preferably carried about 2–2.5 km of cable, but other drum sizes are possible if needed. The whole seismic cable 18 on the drum 16 is not made up of a single cable over its total length, but comprises multiple inter-connectable seismic cable segments each of an individual length of preferably about 200–300 m. The cable segments may be connected directly to each other or by means of a telemetry unit 28 that will be described later. This allows tailoring the cable 18 for the desired seismic survey line 14 and/or easy replacement of a (relatively short) cable segment that is damaged or otherwise out of order. Even in areas where the cable spool vehicle 10 cannot be easily moved, the cable segments are handy and lightweight enough to be transported and laid out by seismic crew members in the conventional way.

The seismic cable 18 (see FIGS. 2 and 3) consists of a main cable 20 and numerous outlet cables 22, each of which bears at least four, and preferably up to ten, digital seismic sensors 24 that comprise 3-component accelerometers and in a preferred embodiment 3-component magnetometers. Each sensor 24 produces a unique digital identifying signal which identifies the sensor (and therefore its output signal(s)). The data from these seismic sensors 24 at each outlet cable 22 may be grouped together with digital processing. In FIG. 1, for simplicity reasons, the complete seismic cable 18 is symbolised by a single line.

At the desired seismic survey line 14, the free end of the seismic cable 18 spooled on the drum is laid on the ground. The cable spool vehicle 10 then drives along the seismic survey line 14 while the drum 16 is actively driven to revolve and to actively unspool the seismic cable 18. The seismic cable 18 is laid out upon the ground substantially without any stress or tension, and is neither dragged nor pulled. To achieve this, the speed of the forward movement of the cable spool vehicle 10 is continuously controlled and co-ordinated with a desired revolving speed of the cable drum 16. During unspooling of the seismic cable 18 the speed of the drum 16 is also controlled and, if necessary, readjusted according to the measured tension on the seismic cable 18. Another factor which may require an adjustment of the speed of the drum 16 is the true geographical position of the cable spool vehicle 10. The preferred embodiment of the cable spool vehicle 10 is equipped with an electronic system that determines its geographical position, ie a Global Positioning System (GPS). Such a GPS system enables the driver or an assistant to monitor the actual geographical position of the vehicle 10 with high accuracy, ie to within a few meters, and allows such positioning data to be recorded. According to the invention, not only the truck positioning data are monitored and recorded as the cable spool vehicle 10 follows the desired seismic survey line 14, but also all geographical positioning data that relate to each laid out seismic sensor group.

As also shown in FIG. 1, electronic circuits 28 are placed along the seismic survey line 14. These electronic circuits 28 are so-called signal concentrators that gather and further transmit the digital output signals of the seismic sensors 22 during the seismic data acquisition. These electronic signal concentrators 28 (see also FIG. 2) are placed at standard intervals along the seismic cable 18 and, in preferred embodiments of the seismic cable 18, are implemented as integrated, relatively small parts of the seismic cable 18 which are also wound on the drum 16 on the cable spool vehicle 10.

Power supply boxes 30, that typically comprise batteries, serve to power up all electronic equipment that is connected to the seismic cable 18, including the seismic sensors 22. Network router units 32 that are linked in a "back-bone" (or "cross-line") scheme allow the seismic cable 18 of one seismic survey line 14 to be connected to the seismic cable of an adjacent seismic survey line and to a seismic data recording vehicle 34. The network router units 32 organise the data transfer between the seismic cables 18 and the cross-lines. FIG. 1 shows that the power supply units 30 are also attached to the seismic cable 18 at standardised intervals. In order to let the aforementioned units 30 and 32 be connected to the seismic cable 18, the cable spool vehicle 10 has to stop at the desired places along the seismic survey line 14. Normally a power supply unit 32 is used at the end of a seismic cable section that equals the cable length that can be spooled on a drum 16.

The laying out of seismic cables 18 is continued in one seismic survey line 14 until the cable spool vehicle 10 has completed the particular survey line, as shown in FIG. 1. The laid out seismic cable 18 is then disconnected from the drum 16 and the cable spool vehicle 10 moves to another seismic survey line. In a case where more seismic cable 18 is needed than there is still on its drum 16, the cable spool vehicle 10 may receive a replacement full drum.

When all the cables 18 are in place and interconnected in a seismic spread for a seismic data acquisition, a line test is performed to verify that all sensors, cables and attached electronic units work properly. After replacement of improperly working equipment if necessary, the seismic data acquisition is carried out in a way that in principle is known to those skilled in the art.

One advantage of seismic data acquisition using the layout illustrated in FIG. 1 resides in the fact that the digital seismic sensors, the aforementioned 3-component accelerometers, which are used allow the measurement of gravity related signals. Together with measurements from the 3-component magnetometer, this allows a transformation of the actually measured seismic signal components into a desired-reference co-ordinate system. The entire signal related data transfer on the seismic cables in the survey spread is digital. The power distribution along the survey lines is performed over relatively long distances that equal about the maximum cable length on the drum of the cable spool vehicle.

FIG. 1 also illustrates how easily the seismic cable 18 can be picked up again. In order to do so, the cable spool vehicle 10 (in the drawing the lower vehicle), now with an empty drum 16, is moved to a seismic survey line from which the seismic cable 18 is to be removed. In principle, the respooling of the seismic cable 18 on the drum 16 is performed the same way as laying out the seismic cable 18. At each place where power units 30 and network router units 32 are attached to the cable 18, the spool truck 10 stops, and after the disconnection of each unit the cable is connected to the cable that is already spooled on the drum 16 and then wound thereon. A cable test may be run before a cable section is spooled on the drum 16. This allows the identification of defective cable segments and/or sensors that are out of order, so that they can be replaced or removed before spooling. This makes sure that only properly working seismic cable and sensors are on a drum, and that the spool truck may directly lay out the just respooled cable at another place if needed.

Usually more than one cable spool vehicle 10 will be used at once, as shown in FIG. 1. Thus sections of seismic cable 18 which are no longer needed for the seismic survey can be picked while at the same time at a different position another truck 10 may lay out sections of seismic cable 18 required for a following part of the seismic survey.

Figure 2:
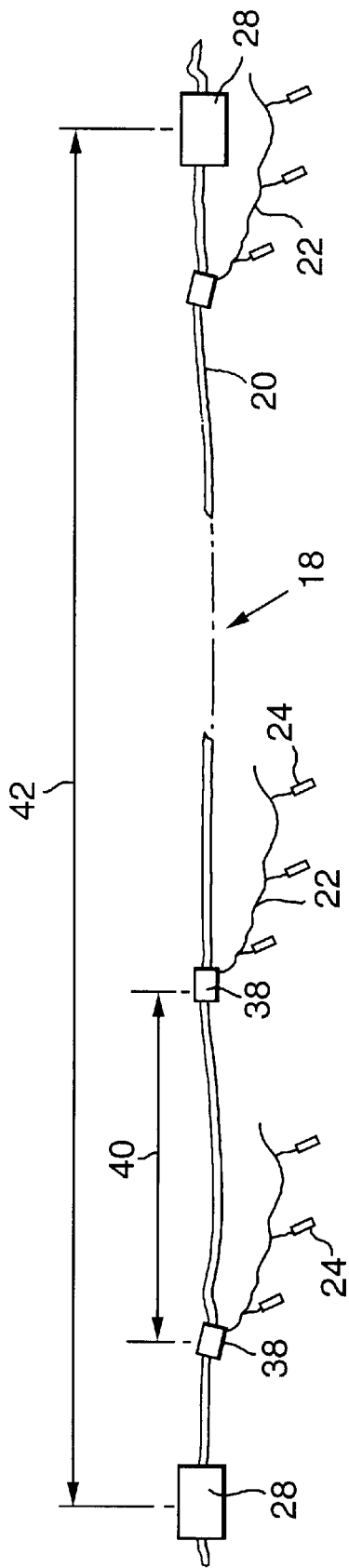
FIG. 2 is a more detailed view of part of a seismic cable of FIG. 1.
Figure 3:
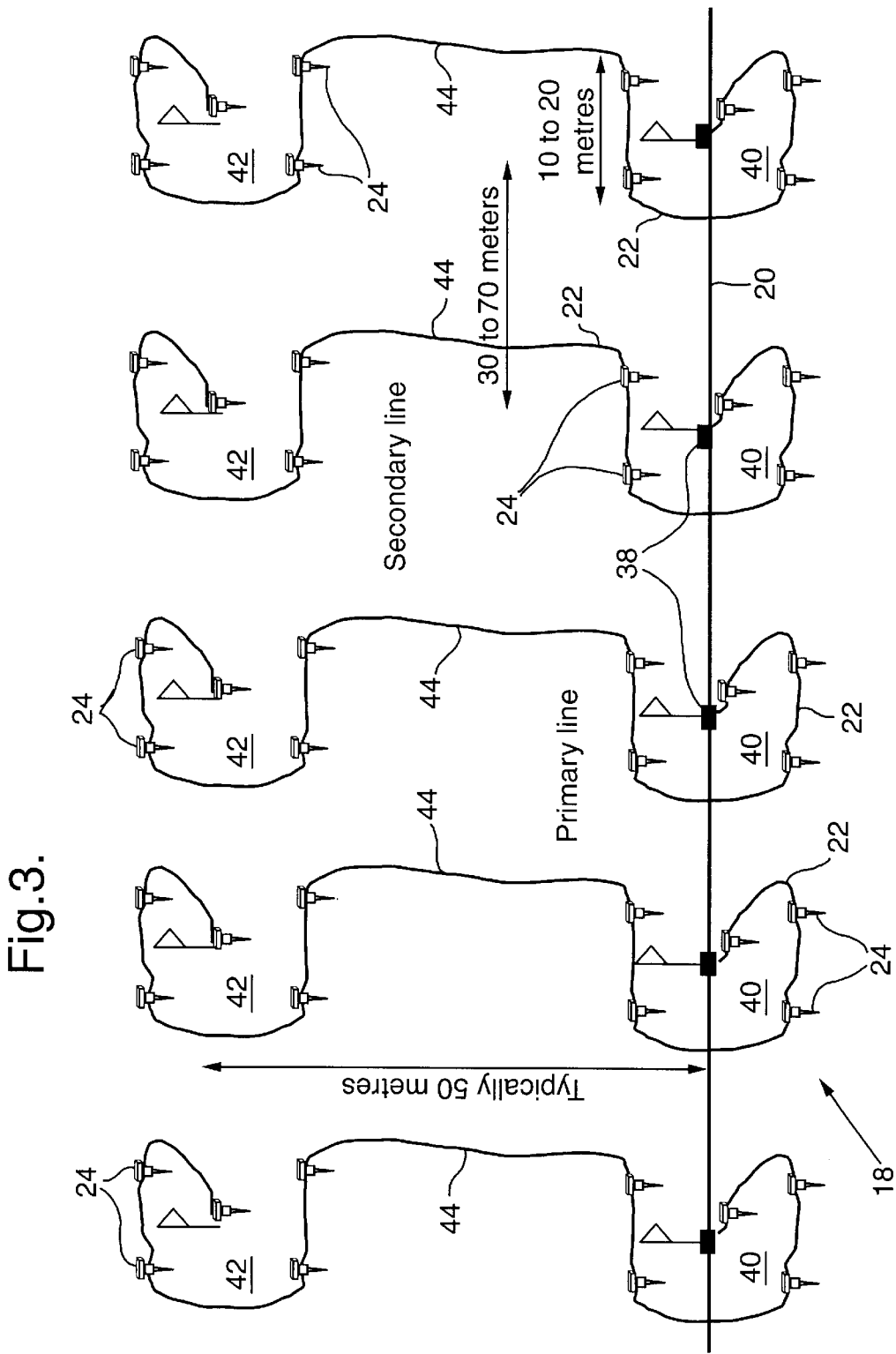
FIG. 3 shows a first embodiment of the present invention.

FIGS. 2 and 3 show the seismic cable 18 in more detail. At regular intervals 40, preferably around 50 meters, the main cable is equipped with cable take outs 38 that mechanically as well as electrically connect the outlet cables 22 and the seismic sensors 24 to the main cable 20. The take outs 38 allow the quick disconnection of an outlet cable 22 from the main cable 20 if the seismic sensor group has to be replaced or just to be left out. This ensures full liberty to the user to realise various forms of seismic survey lines or seismic spreads. After a certain number of take outs 39 along the main cable 20, the electronic signal concentrators 28 are integrated into the seismic cable 18 as shown. Their function as telemetry units has been already described above. The interval 42 is always an odd multiple of the interval 40 between two take outs 38, because this guarantees that signal concentrators 28 are always placed in the middle between two adjacent take outs 38.

The "multiple line" concept which constitutes the essence of the present invention will now be described with reference to FIGS. 3 to 8.

Thus as can be seen in FIG. 3, the ten sensors 24 of each outlet cable 22 connected to a given main cable 20, instead of being arranged to form a single group having its centre of gravity substantially aligned with the respective centres of gravity of the single groups formed by the sensors 24 of the other outlet cables 22 connected to the same main cable 20, are laid out to form first and second groups 40 and 42 respectively, each containing five of the sensors 24 and having respective centres of gravity that are spaced apart in a direction perpendicular to the main cable 20. The centres of gravity of the first groups 40 are aligned with each other, typically along the line of the main cable 20, and the centres of gravity of the groups 42 are also aligned with each other, along a line which is substantially parallel to the main cable 20 and typically spaced about 50 meters away from it. To facilitate this 50 meter spacing, each outlet cable 22 is provided with an increased length portion 44 in its centre, between the fifth and sixth sensors 24. The portion 44 can if desired be implemented as an extension cable with connectors enabling it to be connected in series in the outlet cable.

Figure 4:
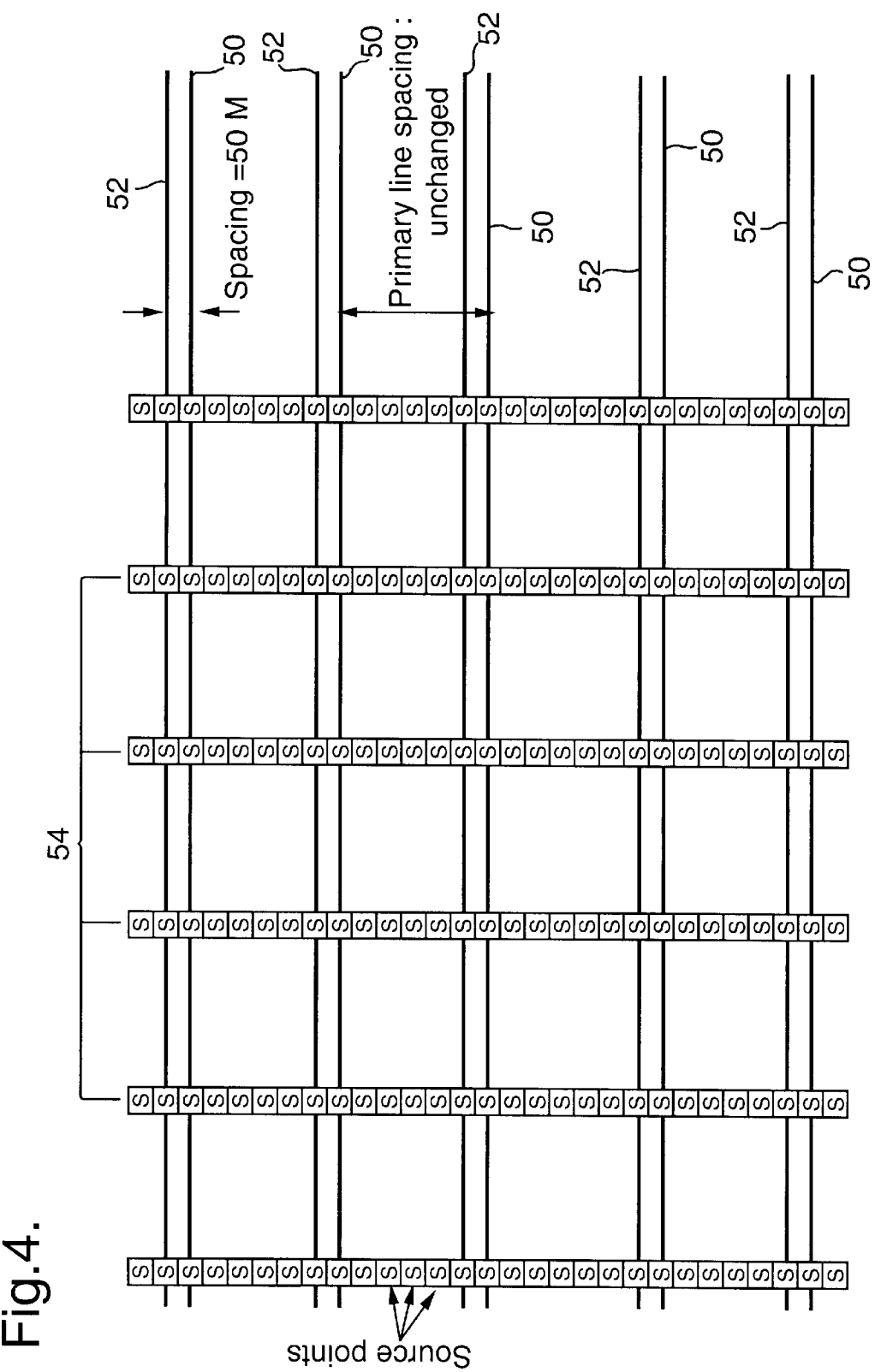
FIGS. 4 to 7 illustrate four different ways of using the embodiment of the invention shown in FIG. 3.

FIG. 4 shows schematically a first way of acquiring seismic data using a plurality of the seismic cables 18 of FIG. 3. The main cables 20 and the first groups 40 of sensors 24 are collectively represented by the lines 50, while the second groups 42 of sensors 24 are collectively represented by the lines 52. The spacing between the lines 50 is about 400 meters, while the spacing between each line 50 and its corresponding line 52 is about 50 meters. Parallel shot lines 54, spaced about 400 meters apart, extend perpendicularly to the lines 50, with shot points S, at which respective swept frequency acoustic signals are successively directed downwardly into the earth formations beneath the survey area by a vehicle-mounted electro-hydraulic vibrator in known manner, spaced at 50 meters intervals along them. It will be appreciated that in comparison to a conventional arrangement in which the sensors 24 of each outlet cable 22 form a respective single group, with the arrangement of FIG. 4, the cross-line resolution of the survey is doubled, but with only a relatively small increase in equipment costs and layout time.

Figure 5:
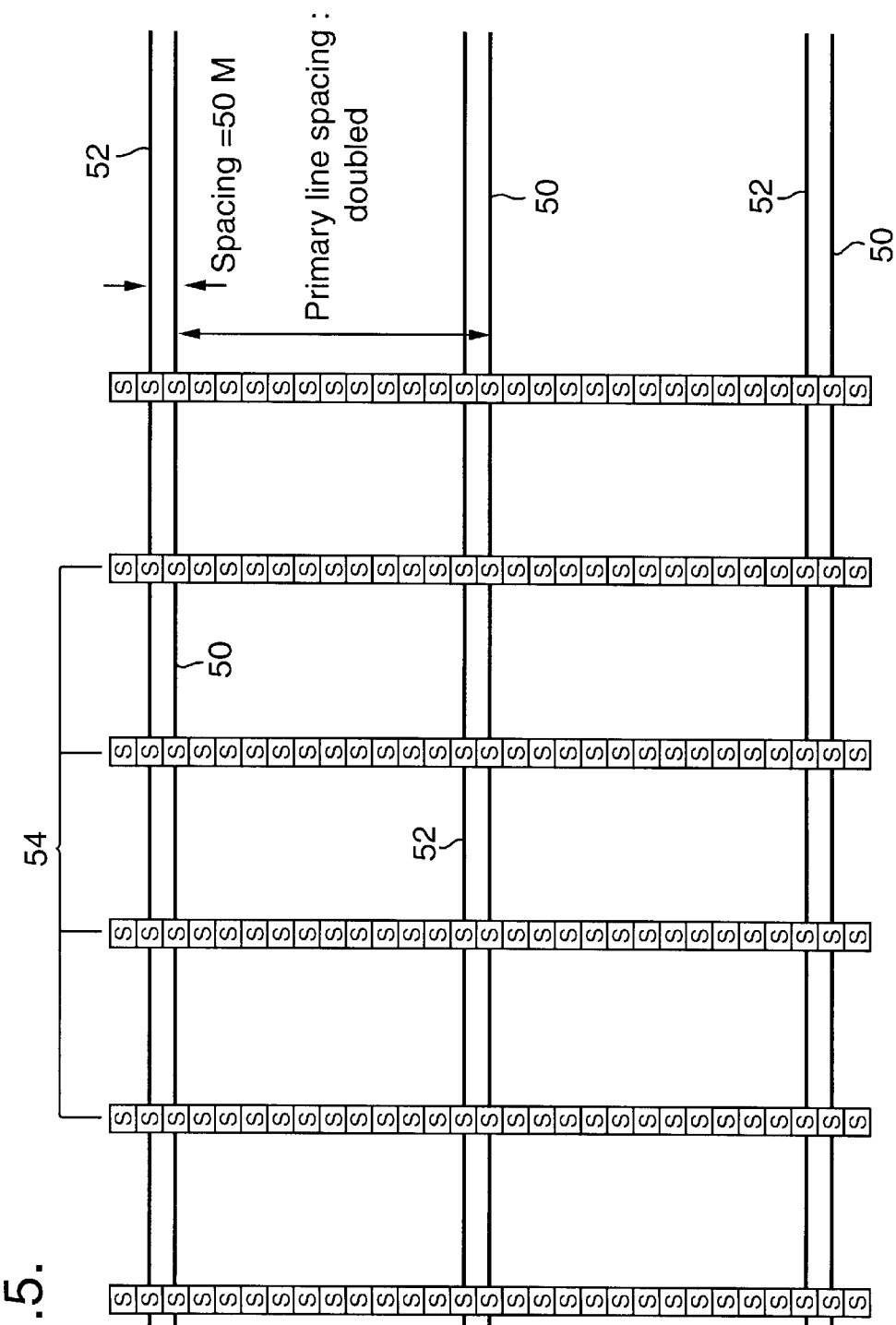
Figure 6:
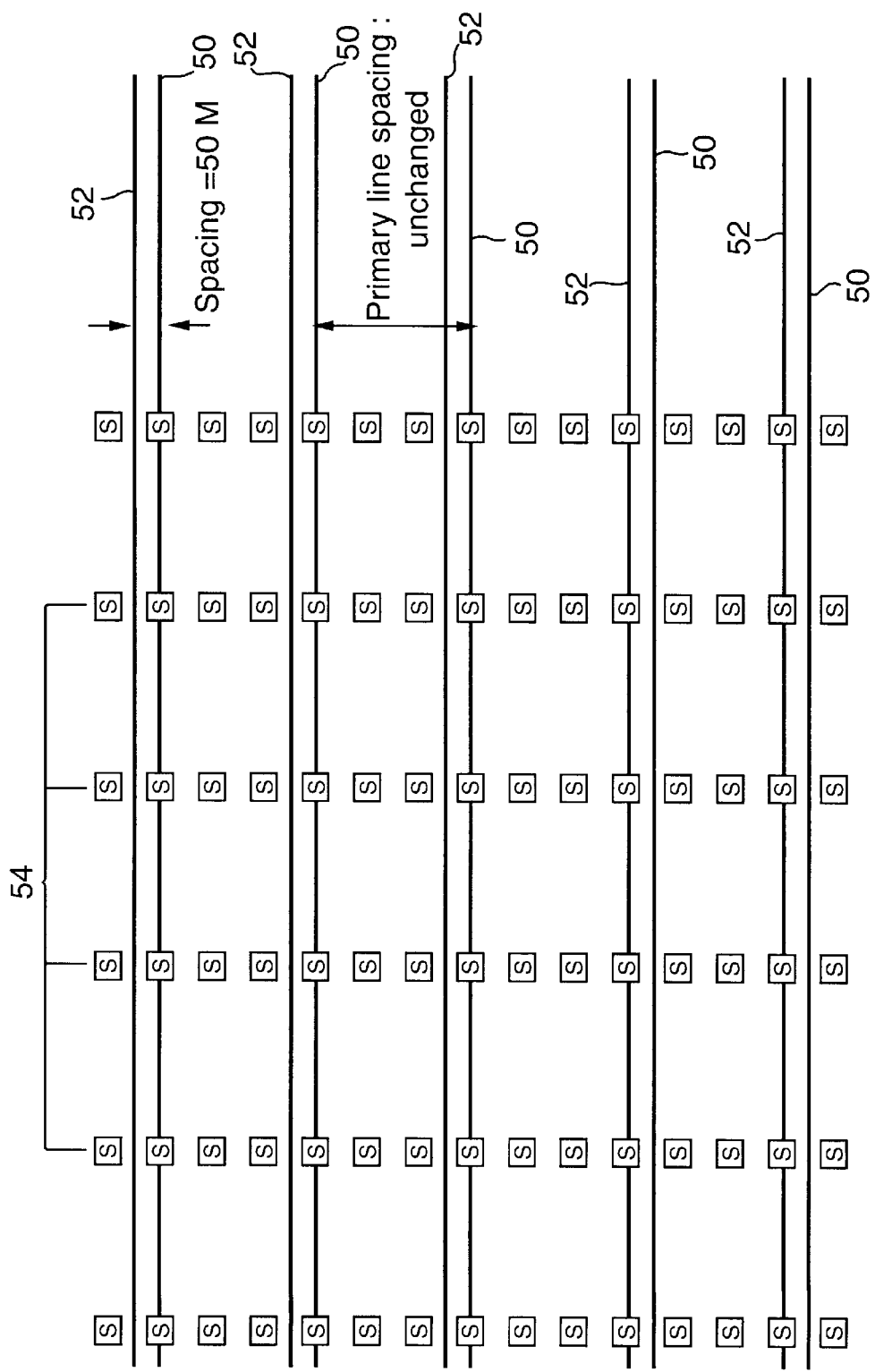

FIG. 5 is similar to FIG. 4, except that the spacing of the lines 50 is doubled to about 800 meters. In this case, and again in comparison to the abovementioned conventional arrangement in which the sensors 24 of each outlet cable 22 form a respective single group, the number of seismic cables is halved, thus reducing equipment costs and layout time by a similar factor, while the cross-line resolution of the survey remains the same.

FIG. 6 is again similar to FIG. 4, except that the spacing between the shot points S is doubled to about 100 meters. In this case, and yet again in comparison to the abovementioned conventional arrangement in which the sensors 24 of each outlet cable 22 form a respective single group, the number of shots is halved, thus substantially reducing the time taken to conduct the survey, while the cross-line resolution of the survey remains the same.

With all of the layouts of FIGS. 4 to 7, the offset and azimuth distributions are substantially unchanged in comparison to the abovementioned conventional arrangement in which the sensors 24 of each outlet cable 22 form a respective single group.

The "multiple line" concept can be pushed up to "triple lines". In that case, even greater increases in resolution and/or savings can be achieved.

The multiple line concept associated with "acoustic positioning" as described in our abovementioned PCT Patent Application No PCT/IB99/01724 allows a reduction of the survey effort for the sensor line. In fact, only one group peg needs to be installed for the main group on the main line. The dual or triple group will be laid without any pre-surveying, but only visual estimation. Acoustic positioning will then be used between the main group and the dual (or triple) one to determine the position of every geophone in these dual and triple groups. From these measurements, the geometric centre of gravity of the dual and triple group can be determined. Combination of this information with ground coupling test results allows re-centring of the dual and triple groups by the weighted group forming concept.

Figure 7:
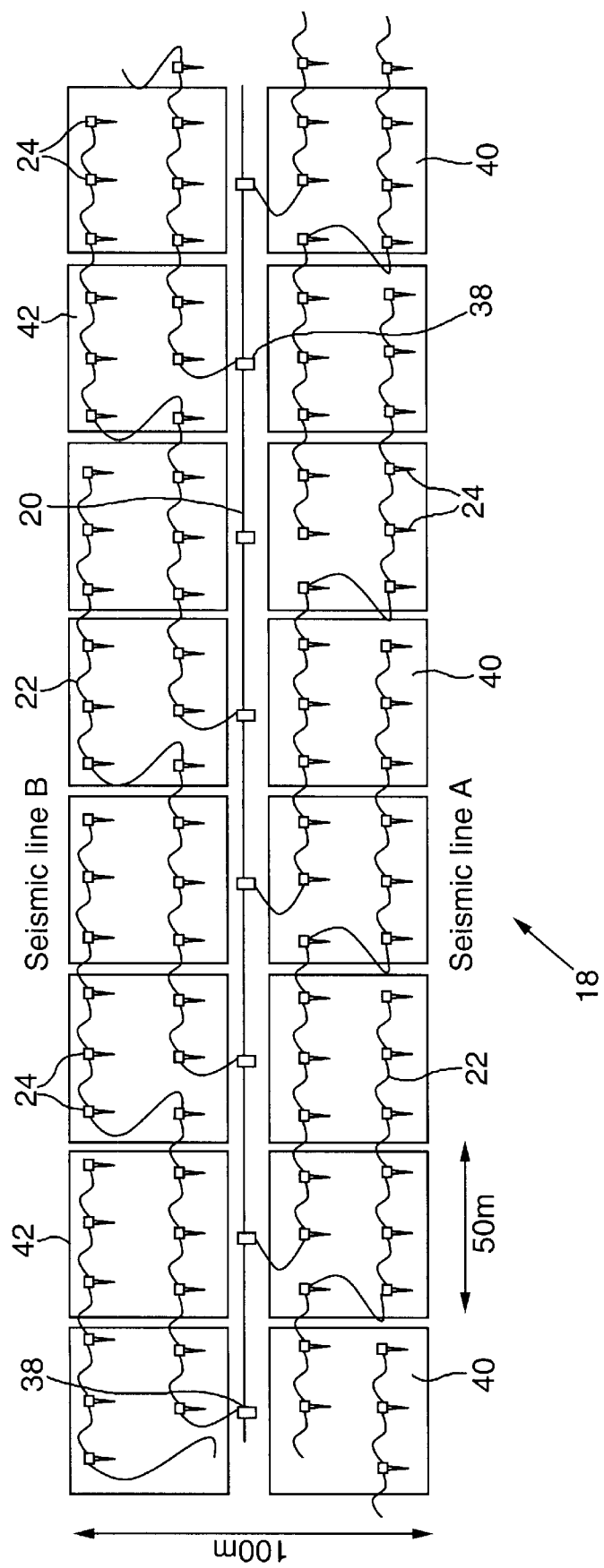

FIG. 7 shows an alternative layout arrangement in which the outlet cables 22 each have twelve sensors 24, and the groups 40, 42 are on opposite sides of the main seismic cable 20. Further, the sensors 24 of a given outlet cable 22 are distributed among three adjacent groups, an arrangement made possible by the fact that each sensor 24 is uniquely identified by its own digital identification signal, thus enabling each sensor output signal to be assigned to its correct group. Again, the resolution is doubled in comparison with the aforementioned conventional arrangement.

Figure 8:
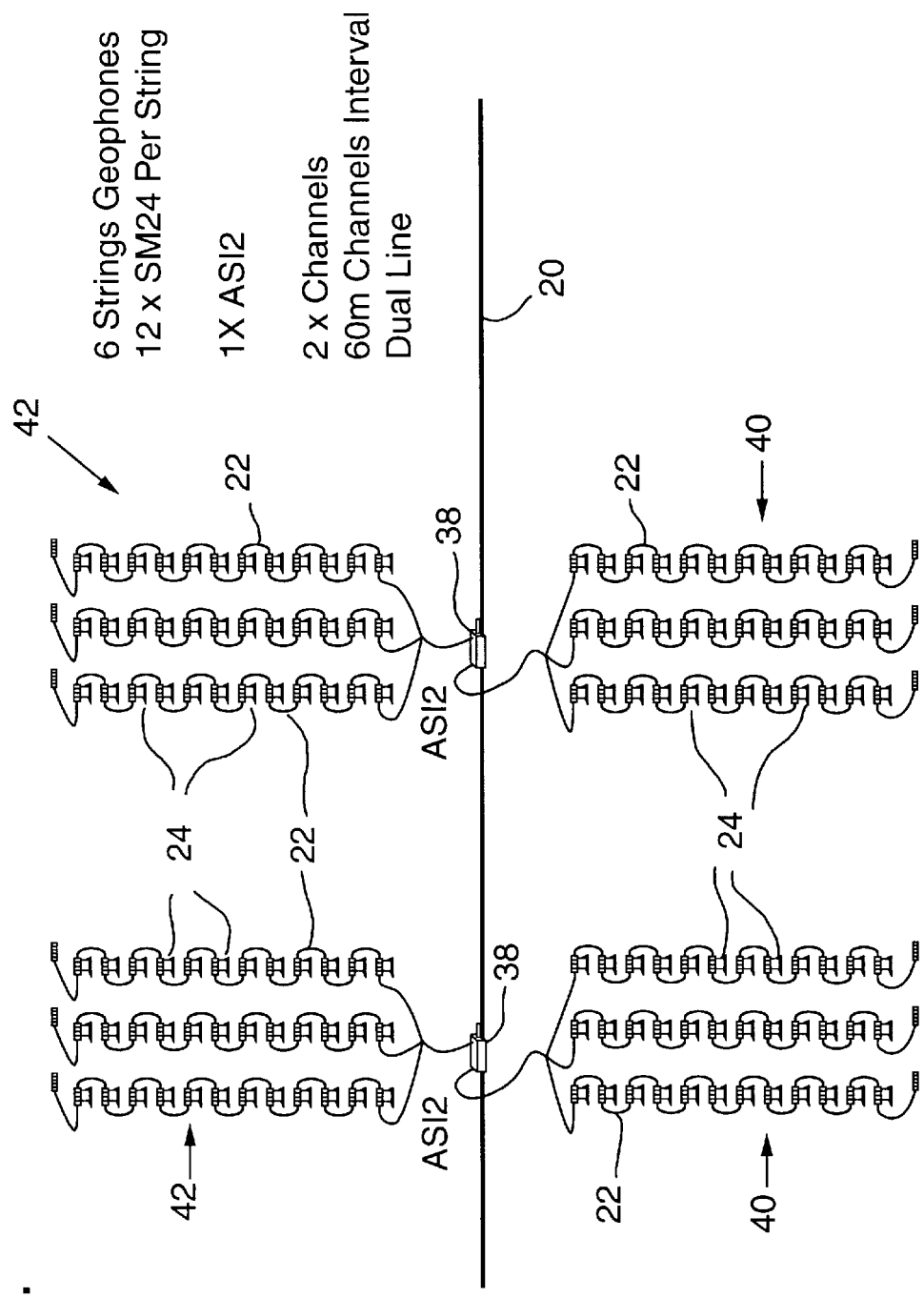
FIG. 8 shows another embodiment of the present invention.

FIG. 8 shows another alternative embodiment in which the sensors 24 are analogue sensors. Each group 40 and 42 contains eighteen sensors 24, whose respective outputs are summed and transmitted to the main cable 20.

What is claimed is:

1. Apparatus for use in seismic data acquisition in a land or transition zone environment, the apparatus comprising:
    at least one seismic data cable which, in use, is laid out along a line of an area to be seismically surveyed, said cable having a plurality of spaced apart connection nodes therealong; and
    a plurality of sensor strings connected to said connection nodes, each sensor string comprising a plurality of seismic sensors connected in series and each adapted to produce a respective output signal representative of a seismic signal received thereby;

wherein each of the plurality of sensor strings is adapted to permit the sensors thereof to be laid out in at least two sets of series-connected groups, each group containing a plurality of the sensors and being adapted to transmit at least one seismic signal to a connection node, and the sets of groups being disposed along respective spaced apart lines generally parallel tote line along which the seismic data cable is laid.

2. Apparatus as claimed in claim 1, wherein each sensor is adapted to produce a digital output signal representative of the seismic signal received thereby, and a respective digital identifying signal which identities the sensor, and is connected to transmit both digital signals to the respective connection node.

3. Apparatus as claimed in claim 2, wherein the sensors of each sensor string are divided between a group in the first set and a group in the second set, and each sensor string includes a portion of increased length between the sensors in the group in the first set and the sensors in the group in the second set, to facilitate the spacing apart of the groups.

4. A method of seismic data acquisition, the method comprising:

laying a seismic data cable along a line of an area to be seismically surveyed, said cable having a plurality of spaced apart connection nodes therealong, and a plurality of sensor strings connected to said connection nodes, each sensor string comprising a plurality of seismic sensors connected in series and each adapted to produce a respective output signal representative of a seismic signal received thereby;

laying the sensors of each of the plurality of sensor strings out in at least two sets of series-connected groups, each group containing a plurality of the sensors and transmitting at least one seismic signal to a connection node, and the sets of groups being disposed along respective spaced apart lines generally parallel to the line along which the seismic data cable is laid;

emitting acoustic signals downwardly into the area to be surveyed, for reflection by earth formation beneath the area; and detecting the reflected signals with the sensors.

5. A method as claimed in claim 4, where each sensor is adapted to produce a digital output signal representative of the seismic signal received thereby, and a respective digital identifying signal which identities the sensor, and the both digital signals are transmitted to the respective connection node.

6. A method as claimed in claim 5, wherein the sensors of each sensor string are divided between a group in the first set and a group in the second set, further comprising including a portion of increased length in each sensor string between the sensors in the group in the first set and the sensors in the group in the second set, further comprising including a portion of increased length in each sensor string between the sensors in the group in the first set and the sensors in the group in the second set, to facilitate the spacing apart of the groups.

7. A method as claimed in any one of claims 4 to 6, wherein said acoustic signals are emitted at substantially uniformly spaced points along at least one line substantially perpendicular to the seismic data cable, and the spacing of the respective lines of the sets of groups of sensors connected tote seismic data cable is substantially equal to the spacing of said points.

8. A method as claimed in anyone of claims 4 to 6, wherein said acoustic signals are emitted at substantially uniformly spaced points along at least one line substantially perpendicular to the seismic data cable, and the spacing of the respective lines of the sets of groups of sensors connected to the seismic data cable is substantially equal to half the spacing of said points.

9. A method as claimed in anyone of claims claims 4 to 6, wherein the sensor strings are connected to the seismic cable the seismic data cable is laid.

10. A method as claimed in anyone of claims 4 to 6, wherein the sensor strings are connected to the seismic cable before the seismic data cable is laid.

* * * * *